US011372135B2

(12) United States Patent
Yin et al.

(10) Patent No.: US 11,372,135 B2
(45) Date of Patent: Jun. 28, 2022

(54) ANGULAR SELECTIVE FILM

(71) Applicant: Lux Labs, Inc., Boston, MA (US)

(72) Inventors: Kezhen Yin, Solon, OH (US); Yichen Shen, Cambridge, MA (US); Wei Li, Brighton, MA (US)

(73) Assignee: Lux Labs, Inc., Boston, MA (US)

( * ) Notice: Subject to any disclaimer, the term of this patent is extended or adjusted under 35 U.S.C. 154(b) by 351 days.

(21) Appl. No.: 16/784,458

(22) Filed: Feb. 7, 2020

(65) Prior Publication Data
US 2020/0271827 A1     Aug. 27, 2020

Related U.S. Application Data

(60) Provisional application No. 62/811,128, filed on Feb. 27, 2019.

(51) Int. Cl.
*G02B 1/04*     (2006.01)
*G02B 5/26*     (2006.01)

(52) U.S. Cl.
CPC .................. *G02B 1/04* (2013.01); *G02B 5/26* (2013.01)

(58) Field of Classification Search
CPC .. G02B 1/10; G02B 1/11; G02B 1/111; G02B 1/113; G02B 1/115; G02B 5/22; G02B 5/26; G02B 5/28; G02B 5/203; G02B 5/223; G02B 5/265; G02B 5/281; G02B 5/282; G02B 5/283; H04N 5/72; H04N 5/74; H04N 5/7408; H04N 5/7441; B32B 17/10018; B32B 17/10027; B32B 17/10036; B32B 17/10055; B32B 17/10064; B32B 17/10073
See application file for complete search history.

(56) References Cited

U.S. PATENT DOCUMENTS

| 9,057,830 | B2 | 6/2015 | Hamam et al. |
| 9,335,027 | B2 | 5/2016 | Hsu et al. |
| 9,458,989 | B2 | 10/2016 | Hsu et al. |
| 9,677,741 | B2 | 6/2017 | Hsu et al. |
| 9,927,616 | B2 | 3/2018 | Hsu et al. |
| 10,073,191 | B2 | 9/2018 | Shen et al. |
| 10,324,237 | B2 | 6/2019 | Soljacic et al. |
| 2006/0146405 | A1* | 7/2006 | Macmaster ............ H04N 5/72 348/E5.136 |
| 2006/0154049 | A1* | 7/2006 | Padiyath ............... G02B 5/287 428/522 |
| 2008/0176973 | A1* | 7/2008 | Qiu ........................ B32B 27/08 523/135 |

* cited by examiner

*Primary Examiner* — Sultan Chowdhury
(74) *Attorney, Agent, or Firm* — Young Basile Hanlon & MacFarlane, P.C.

(57) ABSTRACT

An angular selective film is configured to have a higher transmittance for radiation having an incidence angle in a specified range as compared to radiation having an incidence angle outside of the specified range, and includes a plurality of multilayer modules stacked substantially along a normal direction of the angular selective film. Each multilayer module includes at least first and second polymer layers, which have at least one of the following properties: (i) the first polymer layer is isotropic, the second polymer layer is anisotropic, the refractive indices of the first and second polymer layers are substantially the same in a first direction, and are different in a second direction, or (ii) both the first and second polymer layers are anisotropic, the refractive indices of the first and second layers are substantially the same in a first direction, and are different in the second direction.

50 Claims, 5 Drawing Sheets

ANGULAR SELECTIVE FILM

CROSS-REFERENCE TO RELATED APPLICATION(S)

This application claims priority to and the benefit of U.S. Provisional Application Ser. No. 62/811,128, filed Feb. 27, 2019, the entire disclosure of which is hereby incorporated by reference.

TECHNICAL FIELD

This disclosure relates to angular selective films and methods for producing the angular selective films.

SUMMARY

In a general aspect, an apparatus includes: an angular selective film configured to selectively transmit light having an incidence angle within a first range.

In another general aspect, an apparatus includes an angular selective film is configured to have a higher transmittance for radiation having an incidence angle in a specified range as compared to radiation having an incidence angle outside of the specified range. The angular selective film includes a plurality of multilayer modules stacked substantially along a normal direction of the angular selective film, in which each multilayer module includes at least a first polymer layer and a second polymer layer. The first and second polymer layers have at least one of the following properties: (i) the first polymer layer is isotropic, the second polymer layer is anisotropic, the refractive indices of the first and second polymer layers are substantially the same in a first direction, and the refractive indices of the first and second polymer layers are different in a second direction, or (ii) both the first and second polymer layers are anisotropic, the refractive indices of the first and second layers are substantially the same in a first direction, and the refractive indices of the first and second polymer layers are different in the second direction.

In another general aspect, a method of fabricating an angular selective film includes: melting a first polymer material to form a melted first polymer material; melting a second polymer material to form a melted second polymer material; and coextruding at least the melted first polymer material and the melted second polymer material to form an angular selective film configured to have a higher transmittance for radiation having an incidence angle in a specified range as compared to radiation having an incidence angle outside of the specified range. The angular selective film includes a plurality of multilayer modules stacked substantially along a normal direction of the angular selective film, in which each multilayer module comprises at least a first polymer layer comprising the first polymer material and a second polymer layer comprising the second polymer material. The first and second polymer layers have at least one of the following properties: (i) the first polymer layer is isotropic, the second polymer layer is anisotropic, the refractive indices of the first and second polymer layers are substantially the same in a first direction, and the refractive indices of the first and second polymer layers are different in a second direction, or (ii) both the first and second polymer layers are anisotropic, the refractive indices of the first and second layers are substantially the same in a first direction, and the refractive indices of the first and second polymer layers are different in the second direction.

Particular embodiments of the subject matter described in this specification can be implemented to realize one or more of the following advantages. The angular selective film is capable of selecting light according to its transmission or reflection based at least in part on incident angles of different incident light waves. For example, for some implementations of the film, the incident light with normal incident angle (i.e., an incidence angle of 0°) is able to pass through the film without significant intensity loss, while the incident light with an incident angle larger than about 30° will be substantially blocked by the film.

The details of one or more embodiments of the subject matter described in this specification are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

Polymer optical angular selective film is able to selective light according to its transmission or reflection based at least in part on incident angles of different incident light waves. In particular, a film can be configured such that the incident light with normal incident angle is able to be transmitted with a high transmission coefficient and thus pass through the film without significant intensity loss while the incident light with an incident angle larger than 30° will be reflected with a high reflection coefficient and therefore blocked by the film.

Example Optical Angular Selective Film Structure

Figure 1:
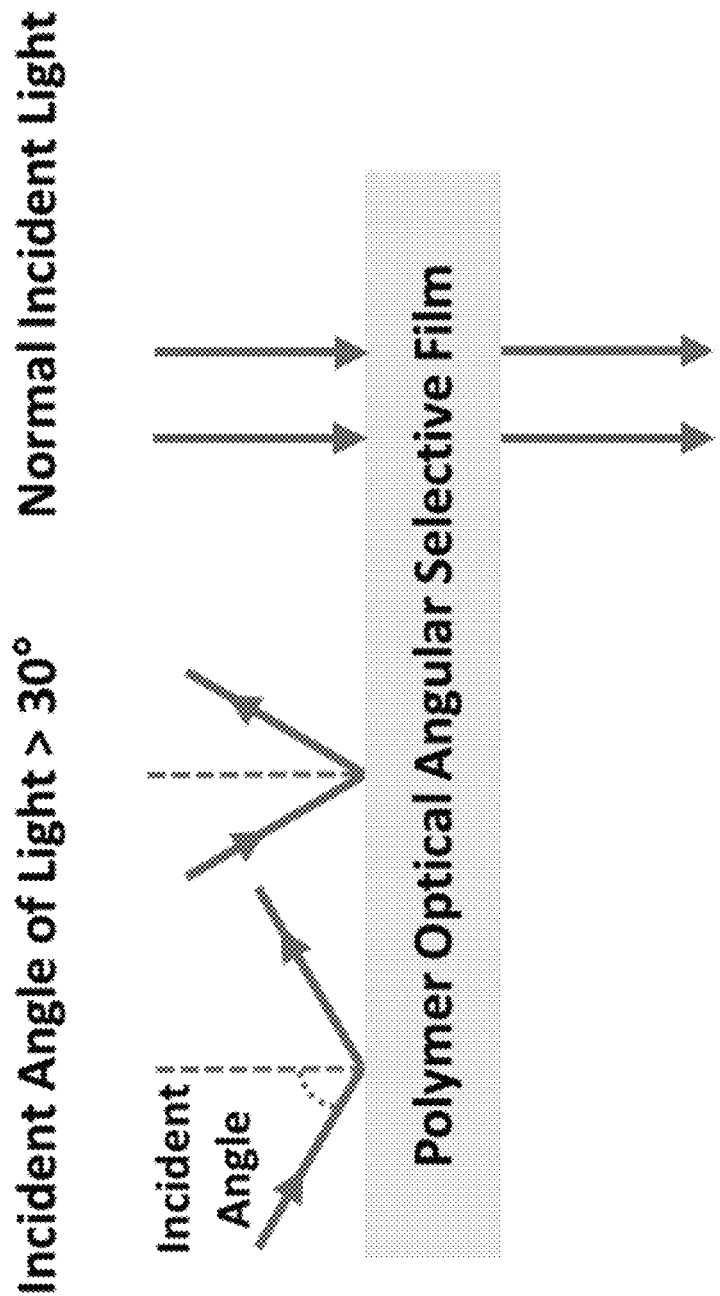
FIG. 1 is a diagram of example reflection and transmission of light through an angular selective film.
Figure 2:
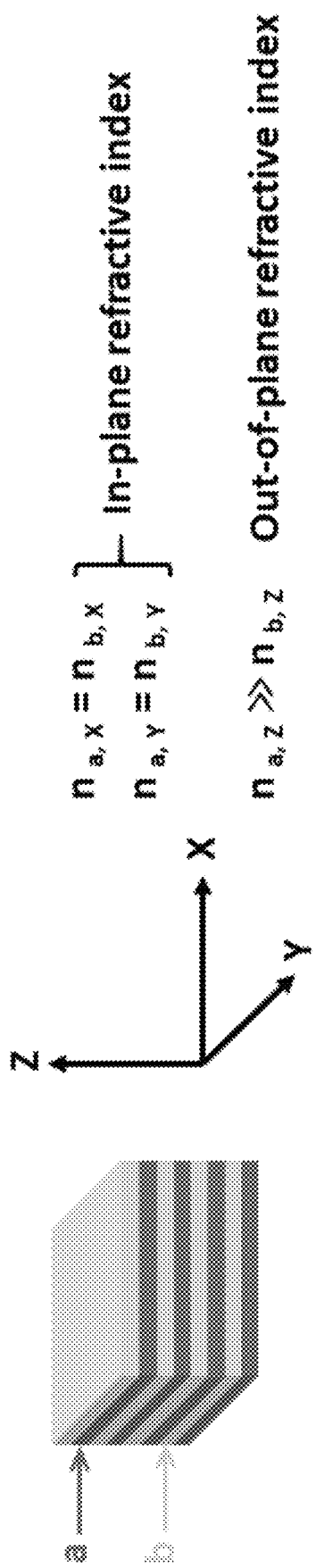
FIG. 2 is a diagram of an example polymer optical angular selective film structure.

Specific structures can be used to achieve an optical angular selective effect for polymer films. Typically, the film can be formed to exhibit a multilayer structure (e.g., as shown in FIG. 2). This polymer multilayer film, in the illustrated example, contains two materials with alternating A/B/A/B structure. The material A is an isotropic transparent material with the same refractive index for components of light polarized along each of the x, y, and z directions. The material B is an anisotropic transparent material with a different refractive index for at least one component of light polarized along the x, y, and/or z direction(s). Moreover, the refractive indices of material A and material B are substantially the same for in-plane directions (the refractive indices for the x, y directions in this example), and the refractive indices of material A and B possess a larger difference for the out-of-plane direction (the refractive index for the z direction in this example).

In some examples, material A and material B can both be anisotropic as long as their refractive indices for selected directions match.

The layers of the optical angular selective film can include at least two layers (the first polymer layer and the second polymer layer). The number of layers in optical angular selective film can possess the alternating layers range from 2 to 1,000,000.

The individual layer thickness of the optical angular selective film of the present invention can range from 2 nanometers (nm) to 1 millimeters (mm). The thickness of the first layer and the second layer can possess a hierarchical structure from nanometer, micrometer to centimeter scale. The individual layer thickness as well as individual layer thickness distribution can be selected to achieve the final properties.

The optical angular selective film can include different material composition, for example, 1/99 to 99/1 for the volume ratio of the first material (A) and the second material (B). The volume ratio of the first and the second material can be controlled and calculated based on individual layer thickness.

Example Material Selection

The materials A and B can be selected to comprise a transparent polymer type of material. In some fabrication techniques for forming the layers of the film, originally, both polymer A and polymer B are isotropic before film processing. In some examples, the polymer A possesses a larger refractive index compared to polymer B. After a multilayer film is produced, an orientation process is performed to change polymer B into anisotropic material (e.g., in-plane refractive index>out-of-plane refractive index) while the process leaves polymer A as an isotropic material. After an outside trigger induces the orientation process (e.g., a trigger that induces a change in mechanical orientation, or induces an application of an electric field and/or a magnetic field), the in-plane refractive index of polymer A and polymer B are the same while the out-of-plane refractive index of polymer A is larger than polymer B. The material selection is one aspect of achieving a particular final product. A particular pair of polymer materials may be selected with different refractive index, and different change in at least one optical property (e.g., change in refractive indices along different material axes) in reaction to the orientation process.

The term "polymer" or "polymeric material" relates to a molecular structure with average molecular weight more than 5,000. The "polymer" or "polymeric material" can include organic material. Such polymer includes thermoplastic polymer and elastomeric polymer, for example. The term "oligomer" or "oligomeric material" relates to a molecular structure with average molecular weight less than 5,000.

Examples of polymers that can be selected as the first and the second material include but are not limited to: Polyethylene (PE), Polypropylene (PP), Polyethylene terephthalate (PET), Polyethylene terephthalate glycol-modified (PETG), Polycarbonate (PC), Polystyrene (PS), Poly(methyl methacrylate) (PMMA), Cellulose, Ethylene/vinyl acetate copolymer (EVA), Styrene/acrylonitrile copolymer (SAN), Polyvinyl chloride (PVC), Poly(vinyl alcohol) (PVA), Nylon, Polysulfone (PSF), Poly(ethylene glycol)/Poly(ethylene oxide) (PEO/PEG), Polyvinylidene fluoride (PVDF), poly(vinylidenefluoride-hexafluoropropylene) (PVDF-HFP), Polyvinylpyrrolidone (PVP), Poly(tetrafluoroethylene) (PTFE), Poly(vinylidene fluoride) (PVF), Poly(propylene oxide) (PPO), Polyvinyl butyral (PVB), Poly(dimethyl siloxane) (PDMS), Isoprene (IR), Butyl rubber (IIR), butadiene rubber (BR), Chloroprene (CR), ethylene propylene diene monomer (EPDM), Nitrile (NBR), Styrene-butadiene (SBR), Fluoroelastomer (FKM) Polyurethane (PU).

The material A and/or material B can be a polymer blend that includes two or more polymers, such as any of the polymers listed above. The material A and/or material B can also include one or more fillers, such as particles or other portions of other materials that are blended with the polymer to form a polymer blend, to manipulate the optical properties of the resulting polymer blend. For example, the material A and/or the material B can include metals (e.g., Ag, Au) or metal oxide particles (e.g., $TiO_2$, $SiO_2$, $BaTiO_3$) to change the refractive index of the blended materials. A polymer may have a refractive index range of 1.3 to 1.8, for example. A particular type of nanoparticle may have a refractive index range of 2 to 5, for example. Therefore, the polymer/nanoparticle composite can exhibit a larger refractive index compared to the original polymer before the introduction of the nanoparticles, even with a little composition of the nanoparticle. If the refractive index of one polymer is sufficiently lower than the refractive index of another polymer, nanoparticles can be added to the polymer with the lower refractive index to reduce the refractive index difference by an appropriate amount to achieve a particular A/B layer refractive index match.

As examples of selection of materials A and B for layers based on properties of the materials, the following sets of relationships can be used to guide selection. A material A can comprise a polymer layer that has a refractive index n1 in the first direction and a refractive index n2 in the second direction, a material B can comprise a second polymer layer that has a refractive index n3 in the first direction and a refractive index n4 in the second direction. For example, the first direction can be parallel to a plane of a surface between layers of the materials A and B, and the second direction can be perpendicular to the plane of the surface between layers of the materials A and B.

In some examples, the materials A and B can be selected such that their refractive indices satisfy the relationships of Property Set 1.

Property Set 1: $|n1-n2|/(n1+n2)<P1$, $P2<|n3-n4|/(n3+n4)$, $|n1-n3|/(n1+n3)<P3$, $P4<|n2-n4|/(n2+n4)$, $P1<0.01$, $0.0125<P2$, $P3<0.01$, and $0.0125<P4$.

For Property Set 1, the difference between n1 and n2 can be relatively small when the material A is isotropic or close to being isotropic. The difference between n3 and n4 can be relatively large when the material B has a significant anisotropy. In some cases, n1 and n3 are substantially equal, and n2 and n4 are substantially different (e.g., a difference of greater than about 0.04).

In some examples, the materials A and B can be selected such that their refractive indices satisfy the relationships of Property Set 2.

Property Set 2: $P2<|n1-n2|/(n1+n2)$, $P2<|n3-n4|/(n3+n4)$, $|n1-n3|/(n1+n3)<P3$, and $P4<|n2-n4|/(n2+n4)$, $0.0125<P2$, $P3<0.01$, and $0.0125<P4$.

For Property Set 2, the difference between n1 and n2, and the difference between n3 and n4, can be relatively large when the materials A and B have a significant anisotropy. In some cases, n1 and n3 are substantially the same in the first direction, and n2 and n4 are substantially different in the second direction.

Film Processing Example Methodologies:

Polymer multilayer film can be processed by various methodologies included but not limited to vapor deposition, block co-polymerization, co-extrusion and layer-by-layer lamination. After multilayer film is produced, an orientation step is included to create anisotropic polymer layer. Special parameters such as temperature, heating time, stretching ratio, and stretching speed, are selected to produce an anisotropic polymer layer B while keeping polymer A as isotropic layer. Additionally, these parameters also need to be selected to match the in-plane refractive indices of polymer A and polymer B while create a refractive index difference at out-of-plane direction.

Additional Examples

Figure 3A:
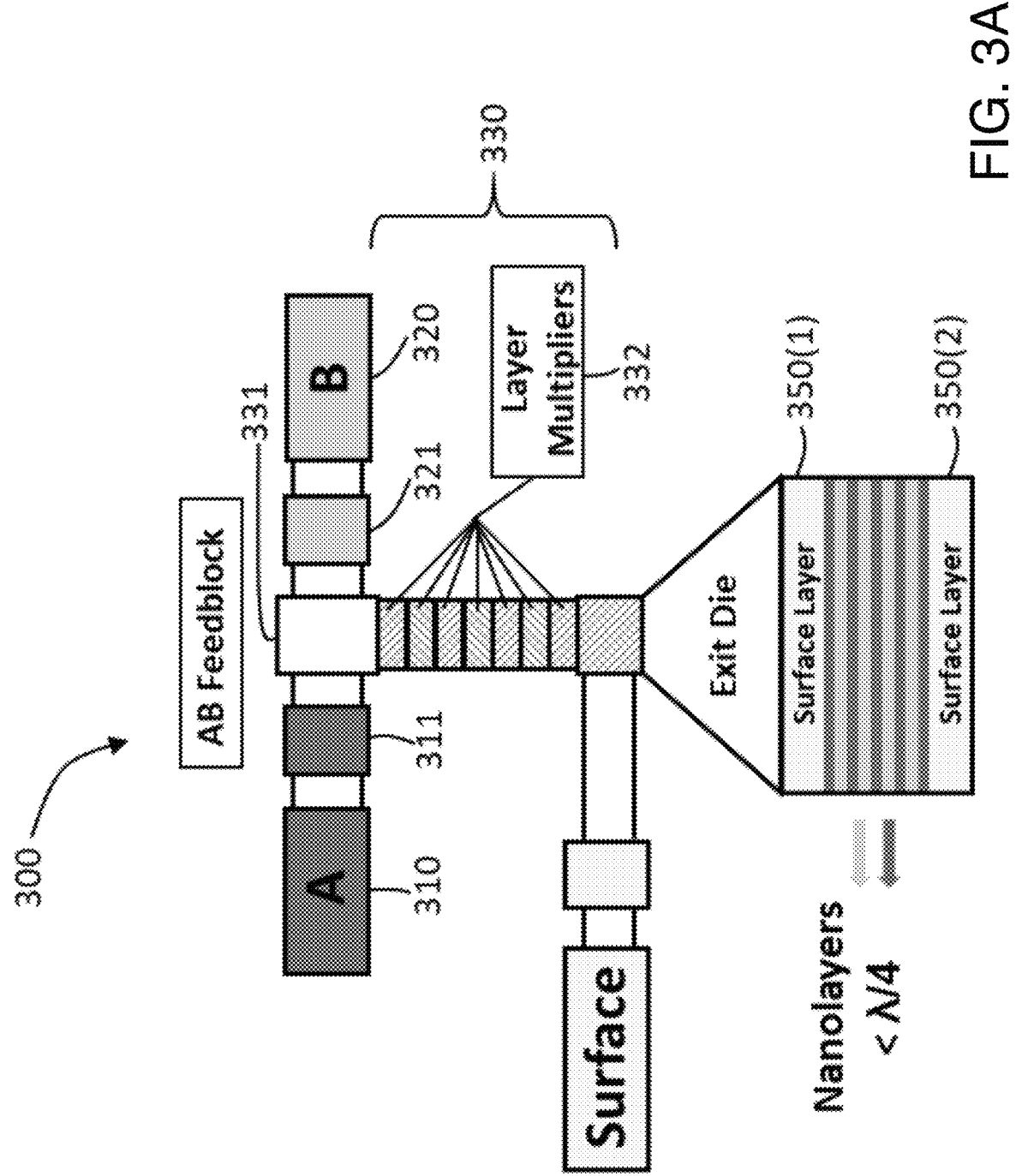
FIGS. 3A and 3B are diagrams of an example multiplier technique for producing multilayer films.
Figure 3B:
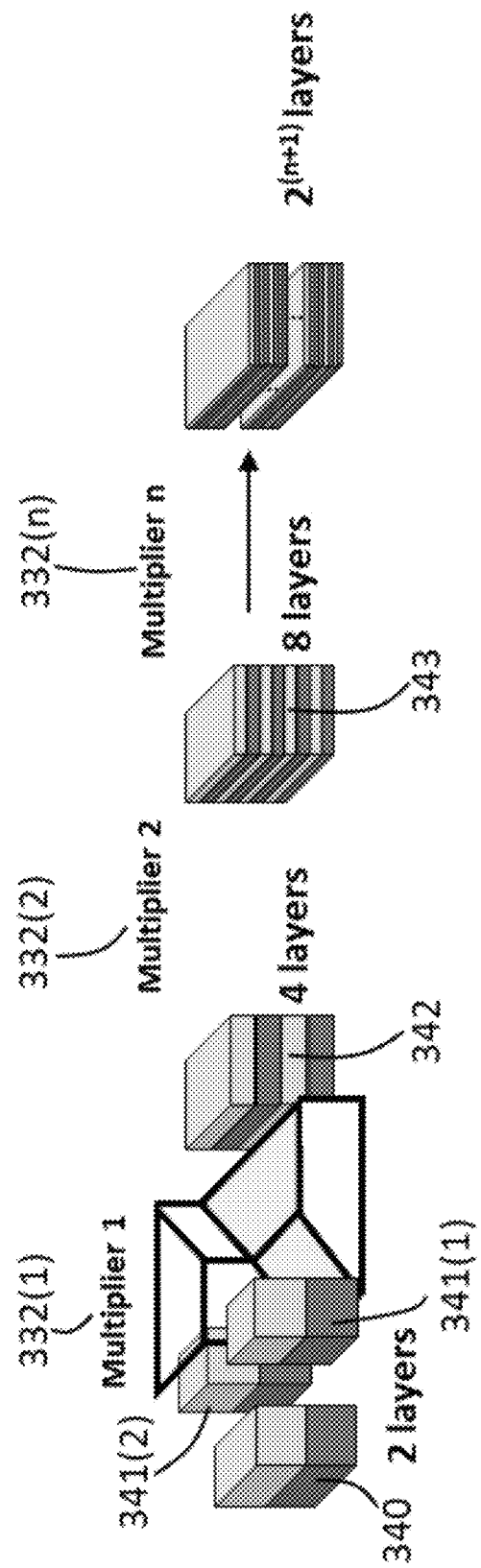

Referring to FIGS. 3A-3B, an example of a process for fabricating a multilayer film is described using an example of one of the methodologies mentioned above. In other examples, other methodologies can be used to achieve the same or similar resulting structure. Polymer A and polymer B were selected with the following optical properties with a delta n.

Polymer optical angular selective films with 256 layers can be produced by a forced assembly film co-extrusion processing technique. An example of a setup of a continuous processing unit 300 configured to produce nanolayered films is illustrated in FIG. 3A. In an example of a forced assembly co-extrusion process performed by the processing unit 300, two polymer materials, A and B, are extruded via two single-screw extruders 310, 320 at a matched viscosity extrusion temperature followed by conveyance into the layering dies 330 by two melt metering pumps 311, 321. The metering pumps 311, 321 are used in this example to ensure a desired volumetric ratio of polymer A and polymer B during melt processing. After the metering pumps 311, 321, polymer melts A and B are combined in a two-layer coextrusion feedblock 331 to form a two layer A/B structure. The two layer polymer melt then flows through a series of layer multiplier dies 332. In each of the multipliers 332, the number of layers in the polymer melt stream is doubled by a cutting, splitting, restacking process. For example, referring to FIG. 3B, polymer melts with an A/B structure 340 can be split horizontally into two A/B melt flows 341(1), 341(2), compressed in the vertical direction, and restacked and spread horizontally to form an A/B/A/B four layer structure 342 after the first layer multiplier die 332(1). Additional layer multiplying dies 332(n) placed in series can continue to sequentially cut, stack, and spread the polymer melt stream resulting in a final polymer melt that can be comprised of $2^{(n+1)}$ number of layers where n is the number of layer multiplying dies in series. A sacrificial skin layer of low density polyethylene (LDPE), which can later be removed prior to stretching and characterization, can be used to protect the films from dust as well as to minimize surface roughness during film coextrusion.

Various thicknesses of polymer optical angular selective films can be generated with any of a variety of thicknesses (e.g., thicknesses from 5-5000 μm). The as-extruded films can be cut into segments having any of a variety of dimensions (e.g., 3"×5"). In order to generate anisotropic layers, the orientation process can be carried out using appropriate equipment (e.g., an Instron 5965 tensile instrument). The stretching temperature can be selected within an appropriate range (e.g., from 80° C. to 140° C.) and with a strain rate within an appropriate range (e.g., from 5%/s to 200%/s). Various draw ratios (e.g., 2x-10x) can be applied to as-extruded optical angular selective films. The optical angular selective effect can be characterized by measuring the transmission spectrum of the films at different angle. The transmission spectrum characterization can be carried out using a spectrometer (e.g., a UV/Vis Spectrometer (Ocean Optics SD 2000)). In some implementations, the desired optical angular selective film will have high light transmission with incident light perpendicular to the film and low light transmission when the incident light has an angle to the film. With increased layer number and improved layer uniformity, the light will be substantially transmitted through the films with normal incident angle and will be substantially blocked from being transmitted through the films with incident angle larger than about 30°.

Figures 4A, 4B, 4C:
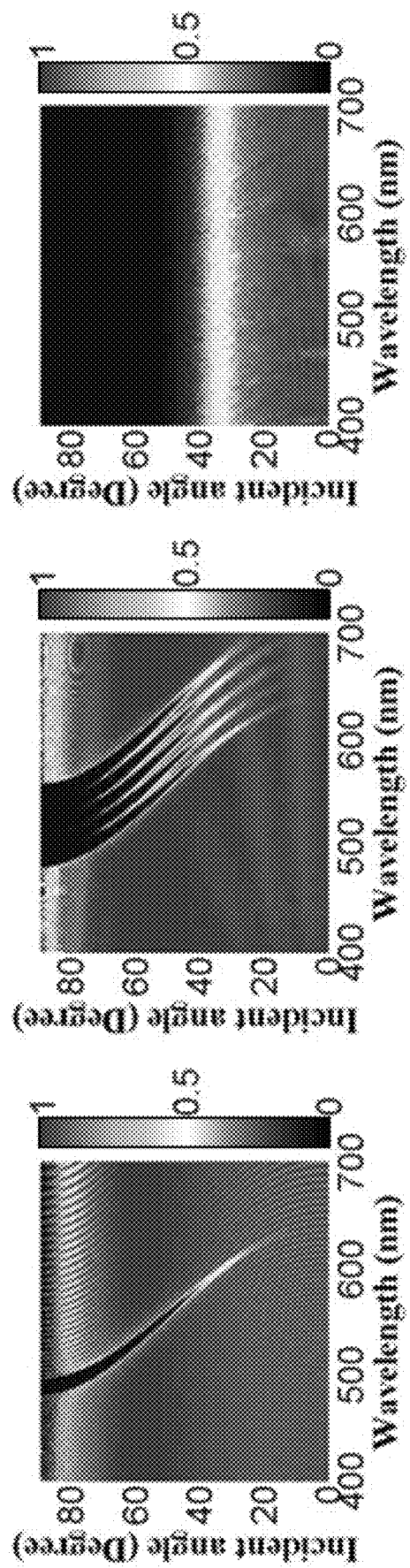
FIGS. 4A, 4B, and 4C are graphs showing optical angular selective effects.

FIGS. 4A, 4B, and 4C show examples of simulated transmission spectra of a polymer optical angular selective film as an intensity map with respect to the wavelength (along the horizontal axis) and incident angle of the incident radiation (along the vertical axis). In each intensity map, transmittance from 0 to 0.5 is shown as gradient black to white color, and transmittance from 0.5 to 1 is shown as gradient white to grey color. These three spectra also illustrate the effect induced by varying the numbers of layers. FIG. 4A shows a simulated transmission spectrum for a polymer optical angular selective film with only one photonic crystal structure. FIG. 4A shows a certain degree of angular selectivity for a single stack. For example, incident light at wavelengths around 500 nm may only be substantially blocked with incident angle beyond 80 degrees. FIGS. 4B and 4C each show a simulated transmission spectrum for an increased number of layers, in which the angular selectively are noticeably improved. For example, in FIG. 4C, incident light in a broadband region from 400 nm to 700 nm can be blocked when the incidence angle is around 30 degrees.

While this specification contains many implementation details, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

Thus, particular embodiments of the invention have been described. Other embodiments are within the scope of the following claims. In addition, the actions recited in the claims can be performed in a different order and still achieve desirable results.

What is claimed is:

1. An apparatus, comprising:
    an angular selective film configured to have a higher transmittance for radiation having an incidence angle in a specified range as compared to radiation having an incidence angle outside of the specified range, the angular selective film comprising:
        a plurality of multilayer modules stacked substantially along a normal direction of the angular selective film, in which each multilayer module comprises at least a first polymer layer and a second polymer layer, in which the first and second polymer layers have at least one of the following properties:
        (i) the first polymer layer is isotropic, the second polymer layer is anisotropic, the refractive indices of the first and second polymer layers are substantially the same in a first direction, and the refractive indices of the first and second polymer layers are different in a second direction, or
        (ii) both the first and second polymer layers are anisotropic, the refractive indices of the first and second layers are substantially the same in a first direction, and the refractive indices of the first and second polymer layers are different in the second direction.

2. The apparatus of claim 1 in which the first polymer layer has a refractive index n1 in the first direction and a refractive index n2 in the second direction, the second polymer layer has a refractive index n3 in the first direction and a refractive index n4 in the second direction, and the first and second polymer layers have at least one of the following properties:
    (i) $|n1-n2|/(n1+n2)<P1$, $P2<|n3-n4|/(n3+n4)$, $|n1-n3|/(n1+n3)<P3$, $P4<|n2-n4|/(n2+n4)$, $P1<0.01$, $0.0125<P2$, $P3<0.01$, and $0.0125<P4$, or
    (ii) $P2<|n1-n2|/(n1+n2)$, $P2<|n3-n4|/(n3+n4)$, $|n1-n3|/(n1+n3)<P3$, and $P4<|n2-n4|/(n2+n4)$, $0.0125<P2$, $P3<0.01$, and $0.0125<P4$.

3. The apparatus of claim 2 in which each the refractive indices n1, n2, n3, and n4 is in a range from 1.2 to 5.

4. The apparatus of claim 2 in which each the refractive indices n1, n2, n3, and n4 is in a range from 1.3 to 1.8.

5. The apparatus of claim 2 in which the first direction is perpendicular to a surface of the first layer, and the second direction is parallel to the surface of the first layer.

6. The apparatus of claim 5 in which $1.55<n1<1.65$, $1.55<n2<1.65$, $1.55<n3<1.65$, and $1.45<n4<1.5$.

7. The apparatus of claim 2 in which the first direction is parallel to a surface of the first layer, and the second direction is perpendicular to the surface of the first layer.

8. The apparatus of claim 7 in which $1.55<n1<1.65$, $1.55<n2<1.65$, $1.55<n3<1.65$, and $1.45<n4<1.5$.

9. The apparatus of claim 1 in which each of the first and second polymer layers has a thickness d in a range from 2 nm to 1 mm.

10. The apparatus of claim 1 in which each of the first and second polymer layers has a thickness d in a range from 90 nm to 110 nm.

11. The apparatus of claim 1 in which each of the first and second layers has a thickness d in a range from 120 nm to 180 nm.

12. The apparatus of claim 11 in which the first polymer layer has a thickness d1, the second polymer layer has a thickness d2, and $|d1-d2|/(d1+d2)>0.05$.

13. The apparatus of claim 11 in which the first polymer layer has a thickness d1 in a range from 135 nm to 145 nm, and the second polymer layer has a thickness d2 in a range from 155 nm to 165 nm.

14. The apparatus of claim 1 in which the angular selective film has a thickness in a range from 10 μm to 10 mm.

15. The apparatus of claim 1 in which the angular selective film has a thickness in a range from 10 μm to 100 μm.

16. The apparatus of claim 1 in which the plurality of multilayer modules comprise at least 100 multilayer modules.

17. The apparatus of claim 1 in which the plurality of multilayer modules comprise at least 10,000 multilayer modules.

18. The apparatus of claim 1 in which the plurality of multilayer modules comprise at least 1,000,000 multilayer modules.

19. The apparatus of claim 1 in which each of the first polymer layer and the second polymer layer comprises a polymeric material having an average molecular weight that is greater than 4,000.

20. The apparatus of claim 1 in which each of the first polymer layer and the second polymer layer comprises a polymeric material having an average molecular weight that is greater than 5,000.

21. The apparatus of claim 1 in which each of the first polymer layer and the second polymer layer comprises at least one of a thermoplastic polymer or an elastomeric polymer.

22. The apparatus of claim 1 in which each of the first polymer layer and the second polymer layer comprises at least one of Polyethylene (PE), Polypropylene (PP), Polyethylene terephthalate (PET), Polyethylene terephthalate glycol-modified (PETG), Polycarbonate (PC), Polystyrene (PS), Poly(methyl methacrylate) (PMMA), Cellulose, Ethylene/vinyl acetate copolymer (EVA), Styrene/acrylonitrile copolymer (SAN), Polyvinyl chloride (PVC), Poly(vinyl alcohol) (PVA), Nylon, Polysulfone (PSF), Poly(ethylene glycol)/Poly(ethylene oxide) (PEO/PEG), Polyvinylidene fluoride (PVDF), poly(vinylidenefluoride-hexafluoropropylene) (PVDF-HFP), Polyvinylpyrrolidone (PVP), Poly(tetrafluoroethylene) (PTFE), Poly(vinylidene fluoride) (PVF), Poly(propylene oxide) (PPO), Polyvinyl butyral (PVB), Poly(dimethyl siloxane) (PDMS), Isoprene (IR), Butyl rubber (IIR), butadiene rubber (BR), Chloroprene (CR), ethylene propylene diene monomer (EPDM), Nitrile (NBR), Styrene-butadiene (SBR), and Fluoroelastomer (FKM) Polyurethane (PU).

23. The apparatus of claim 1 in which each of the first polymer layer and the second polymer layer comprises at least one of polyester, polycarbonate, or polystyrene.

24. The apparatus of claim 1 in which at least one of the first polymer layer or the second polymer layer comprises a blend of two or more polymer materials.

25. The apparatus of claim 1 in which at least one of the first polymer layer or the second polymer layer comprises a filler material to modify an optical property of the polymer layer.

26. The apparatus of claim 25 in which the filler material comprises at least one of metal particles or metal oxide particles.

27. The apparatus of claim 26 in which the filler material comprises at least one of Ag, Au, $TiO_2$, $SiO_2$, $BaTiO_3$, $Al_2O_3$, Si, or GaN particles.

28. The apparatus of claim 1 in which a volume ratio of the first polymer layers to the second polymer layers in the plurality of multilayer modules is less than 1:90.

29. The apparatus of claim 1 in which a volume ratio of the first polymer layers to the second polymer layers in the plurality of multilayer modules is about 1:1.

30. The apparatus of claim 1 in which a volume ratio of the first polymer layers to the second polymer layers in the plurality of multilayer modules is greater than 90:1.

31. The apparatus of claim 1 in which a volume ratio of the first polymer layers to the second polymer layers in the plurality of multilayer modules is in a range from 1:100 to 100:1.

32. The apparatus of claim 1 in which at least one of the multilayer modules comprises a liquid crystal layer and electrodes coupled to the liquid crystal layer configured to provide a control voltage to the liquid crystal layer to control a refractive index of the liquid crystal layer.

33. The apparatus of claim 1 in which at least some of the multilayer modules comprises three different polymer layers.

34. The apparatus of claim 1 in which the radiation has a wavelength in a range from 400 nm to 700 nm.

35. The apparatus of claim 1 in which the angular selective film is configured to transmit radiation having an incidence angle in a range from 0 to 20 degrees with a transmittance of at least 0.5, and to transmit radiation having an incidence angle in a range from 40 to 90 degrees with a transmittance of less than 0.5.

36. The apparatus of claim 1 in which the angular selective film is configured to absorb or reflect radiation having an incidence angle outside of the specified range.

37. The apparatus of claim 1 in which the apparatus comprises a computer having a display screen, and the display screen comprises the angular selective film.

38. The apparatus of claim 1 in which the apparatus comprises a mobile phone having a display screen, and the display screen comprises the angular selective film.

39. The apparatus of claim 1 in which the apparatus comprises a product that comprises the angular selective film selected from the following group of products: a solar panel, a privacy screen, a vehicle, a windshield of a vehicle, and a window.

40. A method of fabricating an angular selective film, the method comprising:
  melting a first polymer material to form a melted first polymer material;
  melting a second polymer material to form a melted second polymer material; and
  coextruding at least the melted first polymer material and the melted second polymer material to form the angular selective film configured to have a higher transmittance for radiation having an incidence angle in a specified range as compared to radiation having an incidence angle outside of the specified range, the angular selective film comprising a plurality of multilayer modules stacked substantially along a normal direction of the angular selective film, in which each multilayer module comprises at least a first polymer layer comprising the first polymer material and a second polymer layer comprising the second polymer material,
  wherein the first and second polymer layers have at least one of the following properties:
    (i) the first polymer layer is isotropic, the second polymer layer is anisotropic, the refractive indices of the first and second polymer layers are substantially the same in a first direction, and the refractive indices of the first and second polymer layers are different in a second direction, or
    (ii) both the first and second polymer layers are anisotropic, the refractive indices of the first and second layers are substantially the same in a first direction, and the refractive indices of the first and second polymer layers are different in the second direction.

41. The method of claim 40 in which coextruding the at least the melted first polymer material and the melted second polymer material comprises:
  coextruding the at least the melted first polymer material and the melted second polymer material to form a multilayer intermediate structure,
  processing the multilayer intermediate structure using a series of layer multiplier dies to form a plurality of intermediate multilayer modules, each of the intermediate multilayer modules including at least a first intermediate polymer layer comprising the first polymer material and a second intermediate polymer layer comprising the second polymer material; and
  stretching the plurality of intermediate multilayer modules to produce the angular selective film, wherein after the stretching of the plurality of intermediate multilayer modules, the first and second polymer layers have at least one of the following properties:
    (i) the first polymer layer is isotropic, the second polymer layer is anisotropic, the refractive indices of the first and second polymer layers are substantially the same in a first direction, and the refractive indices of the first and second polymer layers are different in a second direction, or
    (ii) both the first and second polymer layers are anisotropic, the refractive indices of the first and second layers are substantially the same in a first direction, and the refractive indices of the first and second polymer layers are different in the second direction.

42. The method of claim 40 in which coextruding the at least the melted first polymer material and the melted second polymer material comprises:
  using a nanolayer feedblock to form a plurality of intermediate multilayer modules, each of the intermediate multilayer modules including at least a first intermediate polymer layer comprising the first polymer material and a second intermediate polymer layer comprising the second polymer material, and
  stretching the plurality of intermediate multilayer modules to produce the angular selective film, wherein after the stretching of the plurality of intermediate multilayer modules, the first and second polymer layers have at least one of the following properties:
    (i) the first polymer layer is isotropic, the second polymer layer is anisotropic, the refractive indices of the first and second polymer layers are substantially the same in a first direction, and the refractive indices of the first and second polymer layers are different in a second direction, or
    (ii) both the first and second polymer layers are anisotropic, the refractive indices of the first and second layers are substantially the same in a first direction, and the refractive indices of the first and second polymer layers are different in the second direction.

43. The method of claim 40 in which the stretching of the plurality of intermediate multilayer modules is performed at a temperature in a range from 0° C. to 300° C.

44. The method of claim 40 in which the stretching of the plurality of intermediate multilayer modules is performed at a temperature in a range from 1.00° C. to 140° C.

45. The method of claim 40 in which the stretching was performed at a strain rate in a range between 1%/s to 5000%/s.

46. The method of claim 40 in which the stretching as performed at a strain rate in a range between 80%/s to 120%/s.

47. The method of claim 40 in which the stretching reduces the thickness of the plurality of intermediate multilayer modules to a percentage in a range from 10% to 500% of its thickness before stretching.

48. The method of claim 40 in which the stretching reduces the thickness of the plurality of intermediate multilayer modules to a percentage in a range from 20% to 50% of its thickness before stretching.

49. The method of claim 40, comprising:
   passing the melted first polymer material and the melted second polymer material through metering pumps, and controlling the metering pumps to control a volume ratio of the first polymer layers to the second polymer layers.

50. The method of claim 40 in which the angular selective film has properties described in claim 1.

* * * * *